(12) United States Patent
Todd et al.

(10) Patent No.: US 9,680,890 B2
(45) Date of Patent: *Jun. 13, 2017

(54) STREAMING MEDIA DELIVERY COMPOSITE

(71) Applicant: Ineoquest Technologies, Inc., Mansfield, MA (US)

(72) Inventors: Marc A. Todd, Foxboro, MA (US); James Welch, Mashpee, MA (US); Lynn Birch, Mansfield, MA (US); Matthew Sheahan, Mansfield, MA (US)

(73) Assignee: Ineoquest Technologies, Inc., Mansfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/886,510

(22) Filed: Oct. 19, 2015

(65) Prior Publication Data

US 2016/0044075 A1    Feb. 11, 2016

Related U.S. Application Data

(63) Continuation of application No. 12/788,949, filed on May 27, 2010, now Pat. No. 9,197,684.

(51) Int. Cl.
| | |
|---|---|
| *G06F 15/173* | (2006.01) |
| *H04L 29/06* | (2006.01) |
| *H04L 12/26* | (2006.01) |
| *H04L 29/08* | (2006.01) |

(52) U.S. Cl.
CPC ...... *H04L 65/4069* (2013.01); *H04L 43/0852* (2013.01); *H04L 65/4084* (2013.01); *H04L 65/80* (2013.01); *H04L 67/06* (2013.01)

(58) Field of Classification Search
None
See application file for complete search history.

(56) References Cited

U.S. PATENT DOCUMENTS

| | | |
|---|---|---|
| 6,594,699 B1 | 7/2003 | Sahai et al. |
| 7,970,875 B1 | 6/2011 | Shaffer et al. |
| 2002/0129375 A1 | 9/2002 | Kim et al. |
| 2002/0198984 A1 | 12/2002 | Goldstein et al. |
| 2004/0064576 A1 | 4/2004 | Goldhor et al. |
| 2008/0137690 A1 | 6/2008 | Krantz |
| 2008/0284909 A1 | 11/2008 | Keohane et al. |

(Continued)

FOREIGN PATENT DOCUMENTS

WO    9430014 A1    12/1994

OTHER PUBLICATIONS

International Search Report, mailed Sep. 14, 2011, in counterpart International Application Patent Application No. PCT/US2011/38195, 8 pgs.

(Continued)

*Primary Examiner* — Scott B Christensen
(74) *Attorney, Agent, or Firm* — Michael T. Abramson; Holland & Knight LLP

(57) ABSTRACT

A system delay factor associated with a segment file of a streaming media product is determined. A file transfer delay factor associated with the segment file of the streaming media product is also determined. A media delivery composite is determined for the segment file of the streaming media product based upon, at least in part, the system delay factor associated with the segment file and the file transfer delay factor associated with the segment file.

21 Claims, 5 Drawing Sheets

(56) References Cited

U.S. PATENT DOCUMENTS

2009/0003805 A1  1/2009  Okada
2009/0097413 A1  4/2009  Todd et al.

OTHER PUBLICATIONS

Extended European Search Report and Written Opinion, mailed Jul. 23, 2014, in counterpart European Patent Application No. 11787437.
Examination Report issued on Apr. 24, 2014 in counterpart Australian Patent Application No. 2011258151.
Notice of Allowance issued on Jul. 17, 2015 in counterpart U.S. Appl. No. 12/788,949.
Non-Final Office Action issued Dec. 23, 2011 in counterpart U.S. Appl. No. 12/788,949.
Final Office Action issued on May 11, 2012 in counterpart U.S. Appl. No. 12/788,949.
Non-Final Office Action issued on Apr. 10, 2014 in counterpart U.S. Appl. No. 12/788,949.
Final Office Action issued on Oct. 2, 2014 in counterpart U.S. Appl. No. 12/788,949.
Non-Final Office Action issued on Feb. 12, 2015 in counterpart U.S. Appl. No. 12/788,949.

STREAMING MEDIA DELIVERY COMPOSITE

CROSS REFERENCE TO RELATED APPLICATIONS

The subject application is a continuation application of U.S. application Ser. No. 12/788,949, filed May 27, 2010, the contents of which are all incorporated by reference.

TECHNICAL FIELD

The present disclosure GENERALLY relates to streaming media, and more particularly relates to performance metrics associated with streaming media.

BACKGROUND OF THE DISCLOSURE

Streaming media is an increasingly popular method for providing, and consuming, media products including various video and audio products, such as video on demand, internet television, streaming radio, and the like. However, there are many factors which may impact the quality of the streaming media performance that can negatively impact the end user experience. A commonly experienced problem is a delay or freeze-frame experienced during consumption of the streaming media product, in which all media data downloaded to the client has been played, and the client is waiting for the next piece of media data. Such freezes, or hangs, give rise to a great deal of user frustration and dissatisfaction.

In the interest of maintaining user satisfaction, and therefore user volume, streaming media providers are CONSTANTLY working towards improving media distribution systems. However, given the complexity of streaming media distribution systems, it may often be difficult for a streaming media provider to determine what portions of the streaming media system are resulting the greatest number of problems. As such, much resource allocation toward improving media distribution systems may often be blindly expended. One root problem may be tied to the inability of media distribution providers to accurately assess the performance of their media distribution systems and identify the greatest weaknesses of the media distribution system.

SUMMARY OF THE DISCLOSURE

According to one implementation, a method includes determining by one or more computing devices a system delay factor associated with a segment file of a streaming media product. The method further includes determining by the one or more computing devices a file transfer delay factor associated with the segment file of the streaming media product. A media delivery composite for the segment file of the streaming media product is determined by the one or more computing devices based upon, at least in part, the system delay factor associated with the segment file and the file transfer delay factor associated with the segment file.

One or more of the following features may be included. The system delay factor associated with the segment file may be based upon, at least in part, a request/fulfill time for a subsequent segment file and a transfer time associated with the segment file of the streaming media product. The file transfer delay factor associated with the segment file may be based upon, at least in part, a transfer time for the segment file of the streaming media product.

The method may further include determining by the one or more computing devices a media loss rate associated with the segment file of the streaming media product. The method may also include associating by the one or more computing devices the media delivery composite with a state metric. A media delivery composite for a plurality of segment files associated with the streaming media product may be determined by the one or more computing devices. A plurality of media delivery composites for a plurality of segment files associated with one or more streaming media products may be aggregated.

According to another implementation, a computer program product includes a computer readable medium having a plurality of instructions stored on it. When executed by a processor, the instructions cause the processor to perform operations including determining by one or more computing devices a system delay factor associated with a segment file of a streaming media product. Instructions are also included for determining by the one or more computing devices a file transfer delay factor associated with the segment file of the streaming media product. Instructions are also included for determining by the one or more computing devices a media delivery composite for the segment file of the streaming media product based upon, at least in part, the system delay factor associated with the segment file and the file transfer delay factor associated with the segment file.

One or more of the following features may be included. The system delay factor associated with the segment file may be based upon, at least in part, a request/fulfill time for a subsequent segment file and a transfer time associated with the segment file of the streaming media product. The file transfer delay factor associated with the segment file may be based upon, at least in part, a transfer time for the segment file of the streaming media product.

Instructions may be included for determining by the one or more computing devices a media loss rate associated with the segment file of the streaming media product. Instructions may also be included for associating by the one or more computing devices the media delivery composite with a state metric. A media delivery composite for a plurality of segment files associated with the streaming media product may be determined by the one or more computing device. A plurality of media delivery composites for a plurality of segment files associated with one or more streaming media products may be aggregated.

According to yet another implementation, a system includes one or more processors associated with one or more computing devices, and one or more memories coupled with the one or more processors. A first software module is executable by the one or more processors and the one or more memories. The first software module is configured to determine a system delay factor associated with a segment file of a streaming media product. A second software module is executable by the one or more processors and the one or more memories. The second software module is configured to determine a file transfer delay factor associated with the segment file of the streaming media product. A third software module is executable by the one or more processors and the one or more memories. The third software module is configured to determine a media delivery composite for the segment file of the streaming media product based upon, at least in part, the system delay factor associated with the segment file and the file transfer delay factor associated with the segment file.

One or more of the following features may be included. The system delay factor associated with the segment file may be based upon, at least in part, a request/fulfill time for a subsequent segment file and a transfer time associated with the segment file of the streaming media product. The file transfer delay factor associated with the segment file may be based upon, at least in part, a transfer time for the segment file of the streaming media product.

A fourth software module may be executable by the one or more processors and the one or more memories. The fourth software module may be configured to determine a media loss rate associated with the segment file of the streaming media product. A fifth software module may be executable by the one or more processors and the one or more memories. The fifth software module may be configured to associate the media delivery composite with a state metric. A sixth software module may be executable by the one or more processors and the one or more memories. The sixth software module may be configured to determine a media delivery composite for a plurality of segment files associated with the streaming media product. A seventh software module may be executable by the one or more processors and the one or more memories. The seventh software module may be configured to aggregate a plurality of media delivery composites for a plurality of segment files associated with one or more streaming media products.

The details of one or more implementations are set forth in the accompanying drawings and the description below. Other features and advantages will become apparent from the description, the drawings, and the claims.

DETAILED DESCRIPTION OF EXEMPLARY EMBODIMENTS

Figure 1:
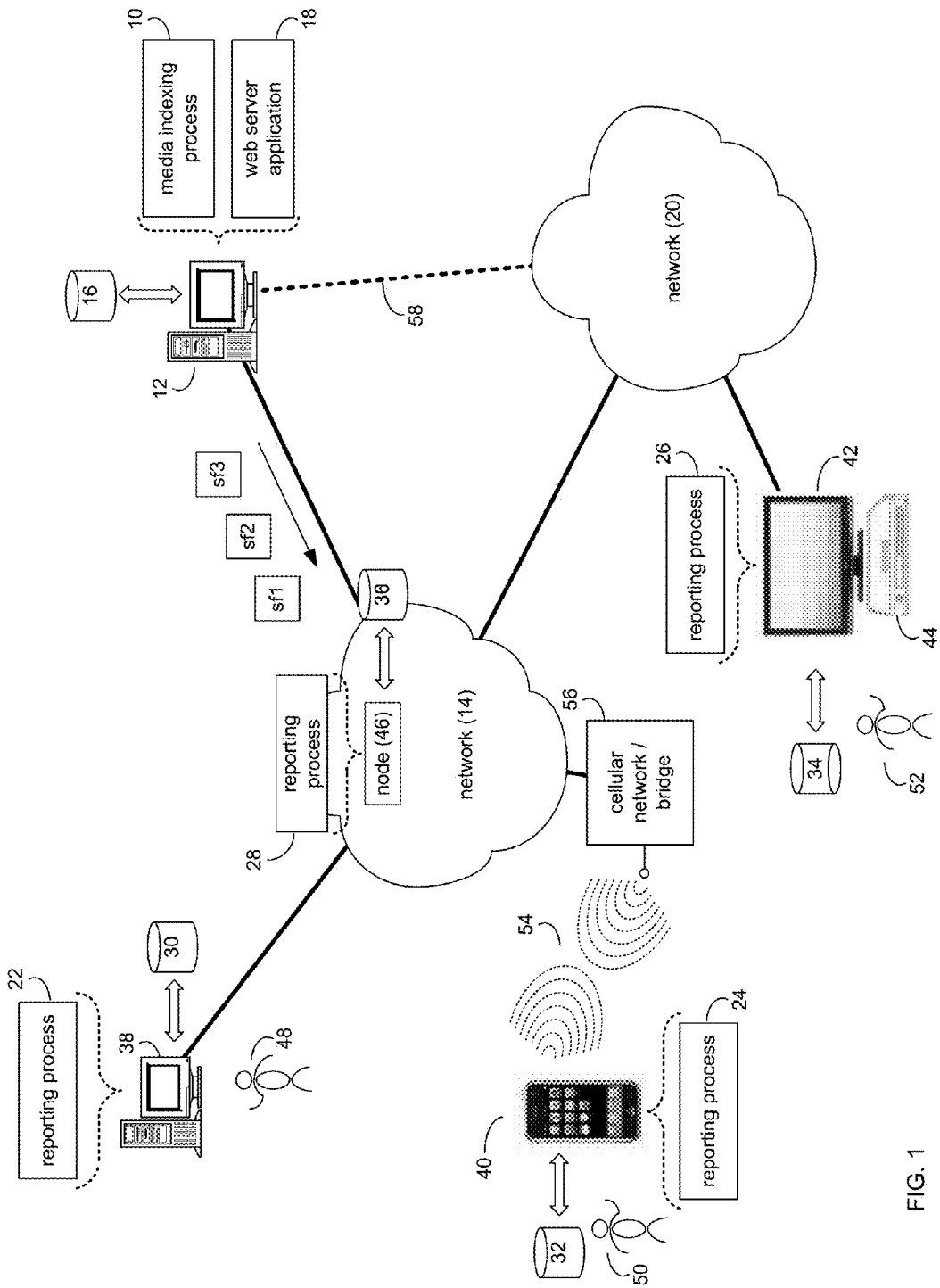
FIG. 1 diagrammatically depicts a distributed computing network including a media indexing process.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable (i.e., computer-usable) medium(s) having computer-usable program code embodied thereon.

Any combination of one or more computer-readable medium(s) may be utilized. The computer-readable medium include a computer-readable storage medium, which may be, for example, but is not limited to, an electronic, magnetic, optical, electromagnetic, infrared, or semiconductor system, apparatus, a device, or any suitable combination of the foregoing. Exemplary computer readable storage medium may include, but is not limited to, a portable computer diskette, a hard disk, a solid state disc drive, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any medium that can contain, or store a program for use by or in connection with an instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on a single computing device, e.g., as a stand-alone software package, and or may be at least partly executed on multiple computing devices that may be remote to one another. In the latter scenario, remote computing devices may be connected to one another through a local area network (LAN) or a wide area network (WAN), or the connection may be made to one or more remote computing devices (for example, through the Internet using an Internet Service Provider), a television broadcast network providing data communication, or the like.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown media indexing process 10 that may reside on and may be executed by server computer 12, which may be connected to network 14 (e.g., the Internet, a local area network, a television broadcast and/or distribution network, or the like). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell® NetWare®; or Red Hat® Linux®, for example (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both), for example.

As will be discussed below in greater detail, media indexing process 10 may determine a system delay factor associated with a segment file of a streaming media product. Media indexing process 10 may also determine a file transfer delay factor associated with the segment file of the streaming media product. Media indexing process 10 may also determine a media delivery composite for the segment file of the streaming media product based upon, at least in part, the system delay factor associated with the segment file and the file transfer delay factor associated with the segment file.

The instruction sets and subroutines of media indexing process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM).

Server computer 12 may execute web server application 18, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both), hosting of one or more web pages and/or web sites, and the like. Network 14 may be connected to one or more secondary networks (e.g., network 20), examples of which may include but are not limited to: a local area network; a wide area network; an intranet; or a television broadcast and/or distribution network, for example.

Media indexing process 10 (alone, or in combination with web server application 18) may receive streaming video reception information from one or more reporting processes (e.g., reporting processes 22, 24, 26, 28). Additionally, media indexing process 10 (alone, or in combination with web server application 18) may determine a media delivery composite based upon, at least in part, the streaming video reception information. Server information collection process 10 may be a standalone application. Additionally/alternatively, server information collection process 10 may interact with web server application 18 and/or may be incorporated into web server application 18 as a module or component of web server application.

The instruction sets and subroutines of reporting processes 22, 24, 26, 28, (which may include one or more software modules) which may be stored on storage devices 30, 32, 34 36 (respectively) coupled to computing devices 38, 40, 42/44, 46 (respectively), may be executed by one or more processors (not shown) and one or more memory modules (not shown) incorporated into computing devices 38, 40, 42/44, 46 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Computing devices 38, 40, 42/44, 46 may include, be associated with, and/or incorporated into one or more video delivery devices. Examples of computing devices 38, 40, 42/44, 46 may include, but are not limited to, personal computer 38, mobile media device 40 (which may include, but is not limited to, a portable media player, multi-media capable cellular telephone, a portable video game device, and the like), and television 42 and/or television set-top box 44, network node 46 (e.g., which may include, but is not limited to, a network switch, a router, or other intermediary network device). Computing devices 38, 40, 42/44, 46 may be capable of being connected to a data network (e.g., network 14, network 20).

Using computing devices 38, 40, 42/44 (and/or a video delivery device associated with computing devices 38, 40, 42/44) users 48, 50, 52 may consume video content (e.g., a streaming media product). For example, using personal computer 38, user 48 may consume video content (i.e., a streaming media product) in the form of video included on a web page (e.g., embedded streaming video, webcasts, podcasts, and the like), internet protocol television, internet based video on demand (e.g., Hulu™), or the like. Similarly, using mobile media device 40, user 50 may consume video content included on a web page, internet based video on demand, or the like. User 52, via television 42 and/or television set-top box 44, may consume video on demand video content, and the like. It will be appreciated that various additional/alternative streaming media content may be consumed via the exemplary devices and/or via other video delivery devices that will be appreciated by those having skill in the art. Additionally, the streaming media content, e.g., which may be received by one or more of computing device 38, 40, 42/44, may be received, via network node 46 (e.g., network node 46 may include a node within network 14 via which the streaming media product may pass during transmission to computing device 38, 40, 42/44).

The various computing devices may be capable of being directly or indirectly coupled to network 14 (or network 20). For example, personal computer 38 is shown directly coupled to network 14 via a hardwired network connection. Similarly, a personal computer (such as a laptop computer) may be wirelessly coupled to network 14 (or network 20) via a wireless communication channel established between the laptop computer and a wireless access point (i.e., WAP), which may be coupled to network 14. The WAP may be, for example, an IEEE 802.11a, 802.11b, 802.11g, Wi-Fi, and/or Bluetooth device that is capable of establishing the wireless communication channel between the laptop computer and the WAP. Mobile media device 40 is shown wirelessly coupled to network 14 via wireless communication channel 54 established between mobile media device 40 and cellular network/bridge 56, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Computing devices 38, 40, 42/44, 46 may each execute an operating system, examples of which may include but are not limited to Microsoft Windows, Microsoft Windows CE®, Red Hat Linux, etc., or a custom operating system (Windows CE is a registered trademark of Microsoft Corporation in the United States, other countries, or both).

For the purpose of discussion, media indexing process 10 will generally be discussed in conjunction with reporting process 22 (executed on computing device 38). However, this should not be construed as a limitation as media indexing process may additionally/alternatively operate in conjunction with other reporting processes (e.g., reporting processes 24, 26, 28). Additionally, and as will be generally discussed, while media indexing process 10 is depicted in FIG. 1, and will be generally described in the context of residing on server computer 12, media indexing process 10 may equally be implemented on a client computing device, e.g., which may be utilized in connection with the consumption of streaming media products (for example, various pieces of streaming media content), and/or with the delivery of streaming media products to end consumption nodes (i.e., devices upon which the streaming media product may be consumed by a viewer). Accordingly, the following description is intended for the purpose of illustration and not of limitation.

Figure 2:
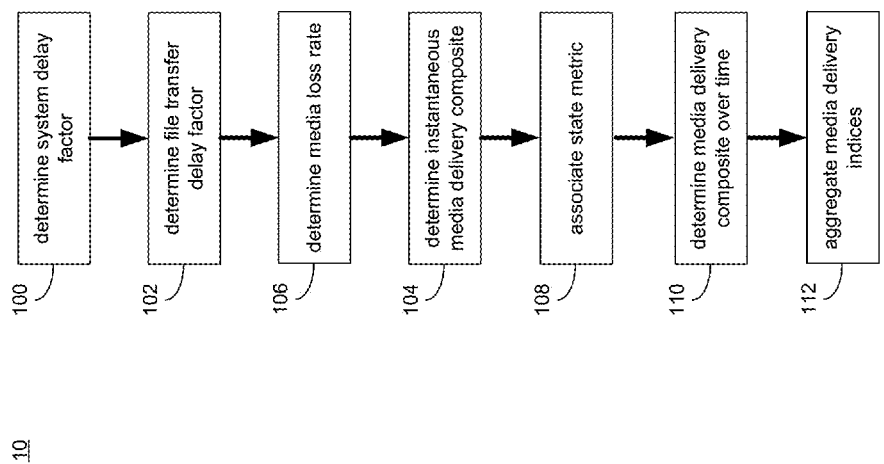
FIG. 2 is a flowchart of a process executed by the media indexing process of FIG. 1.

With reference also to FIG. 2, media indexing process 10 may determine 100 a system delay factor associated with a segment file of a streaming media product. Further media indexing process 10 may determine 102 a file transfer delay factor associated with the segment file of the streaming media product. Media indexing process 10 may also determine 104 a media delivery composite for the segment file of the streaming media product based upon, at least in part, the system delay factor associated with the segment file and the file transfer delay factor associated with the segment file.

As generally discussed above, users (e.g., user 48) may consume a streaming media product via a computing device (e.g., computing device 38). The streaming media product may include a piece of streaming media content, such as streaming video or streaming audio content embedded in a web page, internet protocol television, video on demand program, or the like. The streaming media product may be encoded in any suitable format (e.g., MPEG2, MPEG4, H.264, etc., in the case of streaming video). Various other encoding formats will be understood by those having skill in the art.

The streaming media product may be transmitted to computing device 38 as a series of sequential segment files (e.g., segment files sf1, sf2, sf3, shown in FIG. 1). Each segment file may be a file including a time-wise portion of the streaming media content. For example, the segment file sf1 may include the first ten seconds of the streaming media product (i.e., from t=0 s to t=10 s). Similarly, the segment file sf2 may include the next ten seconds of the streaming media product (i.e., from t=10 s to t=20 s), and the segment file sf3 may include the following ten seconds of the streaming media product (i.e., from t=20 s to t=30 s). In one example, the streaming media product may include a streaming video having a 1.0 Mb/s transport stream (i.e., the rate at which the video is displayed at the decoding node, computing device 38). Accordingly, in the case of a constant bit rate video stream, each segment file may include a 10M bit file (i.e., including 10 s of streaming video encoded at 1.0 Mb/s. While exemplary segment files sf1, sf2, sf3 have been described as being of the same size, this is not considered a limitation of the present disclosure. Similarly, while the exemplary streaming video has been described as having a constant bit rate (and therefore each same-size segment file provides the same video playback duration, or drain time), this is also not intended to be a limitation of the present disclosure, as the bit rate of the streaming media may be variable throughout the duration of the streaming media product.

As discussed above, media indexing process 10 may determine 100 (alone and or in conjunction with reporting process, such as reporting process 22 executing on computing device 38 and/or reporting process 28 executing on node 46, in the above-example) a system delay factor associated with a segment file (e.g., segment file sf1) of a streaming media product. Generally, the system delay factor may include various delays associated with the delivery of segment files (e.g., sf1, sf2, sf3) of the streaming media product to a consumption node (i.e., computing device 38, in the above example). As such, the system delay factor may provide a measure of the entire system's performance, including but not limited to the performance of a consumption client application receiving and/or decoding the streaming media product (e.g., providing an indication of how timely request for segment files are issued by the client to the server, such as server computer 12), performance of the server (e.g., providing an indication of how timely segment file transmissions are initiated), and network performance (e.g., indicating the time taken for segment files to be transfer through the network, including retransmissions necessitated by lost packets and/or incomplete segment file transfers). Accordingly, the system delay factor associated with the segment file may be based upon, at least in part, a request/fulfill time for a subsequent segment file and a transfer time associated with the segment file of the streaming media product.

In the case of adaptive streaming protocols (e.g., Apple Inc.'s HLS, Microsoft Silverlight™, and Real Time Messaging Protocol by Adobe Systems, Inc., for example) the system delay factor associated with a segment file (e.g., sf1) may be updated at beginning of reception of the subsequent segment file (e.g., sf2 in the above example). In such an embodiment, when a segment file (e.g., sf1) is received the drain time (i.e., the drain rate, or rate at which the payload is consumed at the decoding node, multiplied by the payload size) and segment file arrival time may be compared.

Figure 3:
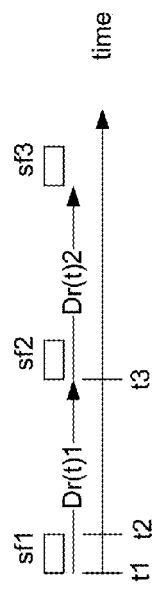
FIGS. 3 through 8 diagrammatically depict various streaming media system conditions.

For example, and referring also to FIG. 3, segment file sf1 may begin arriving at the decoding node (i.e., at computing device 38) at time t1. Reception of segment file sf1 may be complete at time t2. Further, segment file sf1 may have a drain time of Dr(t)1, which as discussed above, may be a function of the size of segment file sf1 and the drain rate of the streaming media product during the time frame included in the content contained in segment file sf1. Further the next portion of the streaming media product, contained within segment file sf2, may begin arriving at computing device 38 at time t3.

Continuing with the above-example in which media indexing process 10 may reside on a device other than the consumption node (e.g., media indexing process 10 may reside on, and be executed by, server computer 12, rather than computing device 38), media indexing process 10 may receive information regarding the drain time of segment file sf1, the start of reception time of segment file sf1, the completion of reception time of segment file sf1, and the start of reception time of segment file sf2 from reporting process 22. However, in other embodiments, the media indexing process 10 may reside on, and be executed by computing device 38, upon which the streaming media product may be consumed.

According to one embodiment, system delay factor may be determined according to the formula:

$$DFsys = Dr(t) - [\max(t2, t3) - t1]$$

Wherein:

DFsys is the system delay factor associated with a segment file;

Dr(t) is the drain time for a segment file (as discussed above);

t1 is the start time for reception of the segment file (e.g., sf1);

t2 is the completion time for reception of the segment file (e.g., sf1); and t3 is the start time of reception of the next segment file (e.g., sf2).

Assuming, for the purpose of example, that segment file sf1 begins arriving at a time of zero second (i.e., t1=0 s), and reception of segment file sf1 is complete one second later (i.e., t2=1 s). Further, and continuing with the previous example of segment file sf1 having a 10M bit media payload, and the relevant portion of the streaming media product having a drain rate of 1.0 Mb/s, the drain time for the media data of segment file sf1 may be 10 s (i.e., 10M bit payload divided by 1.0 Mb/s drain rate giving Dr(t)1=10 s). Accordingly, the system delay factor associated with segment file sf1 (in which the maximum of t2 and t3 is t3=10 s in the example of FIG. 3 in which t3 is greater than t2) would yield:

$$DFsys = 10\ s - (10\ s - 0\ s)$$

DFsys=0 s

The system delay factor of zero may indicate an exactly balanced arrival rate of media data (i.e., data contained within the segment file) and consumption rate of the media data. Accordingly, consumption of the streaming media product at computing device 38 may occur without any disruptions in the streaming media, and without any additional media data being buffered by computing device 38 (e.g., that buffer utilization of computing device 38 may remain generally static as long as the arrival rate and consumption rate of media data are remain generally balanced). However, as the flow rate of incoming media data and consumed media data is generally balanced, a slight shift to an underflow condition could potentially disrupt consumption of the streaming media product.

Figure 4:
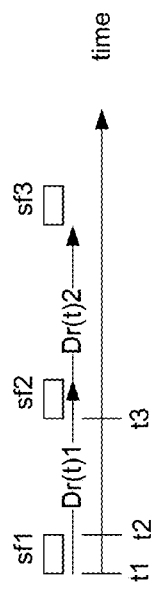

Referring next to FIG. 4, as shown, segment file sf2 may begin arriving before the media data of segment file sf1 has completely played out (i.e., before the entire media payload of sf1 has been consumed by the decoding node). As will be appreciated, in an embodiment utilizing the above DFsys equation, the circumstance depicted in FIG. 4 may give rise to a positive system delay factor (i.e., media data may be arriving at computing device 38 at a faster rate than the media data is being consumed). This may give rise to an overflow condition. In an overflow condition consumption of the streaming media product at computing device 38 may occur without any disruptions in the streaming media, and the resulting overflow media data may be buffered by computing device 38.

Figure 5:
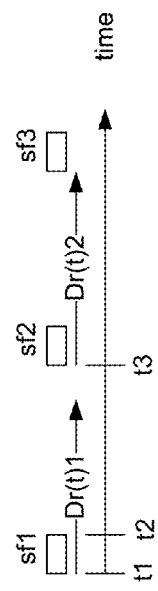

Referring next to FIG. 5, there is shown a situation in which the media data is being consumed at a greater rate than the media data is being received by computing device 38. Specifically, in the example shown in FIG. 5, segment file sf2 does not begin arriving until some time after play out of the media data of segment file sf1 (e.g., t3 lies after the expiration of Dr(t)1). The situation depicted in FIG. 5 may result in a negative system delay factor, or underflow condition, in which media data may be consumed at a higher rate than media data is arriving at the consumption node (i.e., computing device 38). The underflow condition may result in impaired consumption of the streaming media product at computing device 38 (e.g., resulting in video freezing, lapses in audio playback, and the like).

While exemplary embodiments of the various system delay factor conditions of balanced, overflow, and underflow, have been shown, it will be appreciated that other situations may similarly give rise to the various system delay factor conditions. For example, a negative system delay factor condition (e.g., an underflow condition) may arise from a late completing of reception of a segment file (e.g., reception of the segment file may not be complete within the drain time of the media data contained within the segment file). As such, the particular embodiments have been presented only to illustrate the various system delay factor conditions, and should not be construed as a limitation on the possible situations that may give rise to such system delay factor conditions.

In addition to determining 100 the system delay factor, media indexing process 10 may also determine 102 a file transfer delay factor associated with the segment file of the streaming media product. Generally the file transfer delay factor associated with a segment file may be indicative of the time delays associated with the actual transfer of the segment file through the network (e.g., between server computer 12 and computing device 38). As discussed above, the system delay factor may include all system wide factors which may impact the rate at which media data arrives at a consumption node (e.g., computing device 38), including, but not limited to, client, server, and network delays. Media indexing process 10 may determine the file transfer delay factor, which may only account for network characteristics impacting the actual transfer of the segment file from the server to the computing device (e.g., network performance issues, packet retransmissions necessitated by transmission losses, etc.).

The file transfer delay factor associated with the segment file may be based upon, at least in part, a transfer time for the segment file of the streaming media product between server computer 12 and computing device 38. Additionally/alternatively, a file transfer delay may be determined between server computer 12 and an intermediate node (e.g., node 46), and/or between the intermediate node (e.g., node 46) and computing device 12. As such, file transfer delays through various segments of the network (e.g., network 14) may also be characterized.

According to an embodiment, the file transfer delay factor may be determined 102 based upon the relationship:

$$DFft = Dr(t) - [t2 - t1]$$

Wherein:

DFft is the file transfer delay factor;

Dr(t) is the drain time of the media data of the segment file;

t1 is the start time of reception of a segment file (e.g., sf1); and t2 is the completion time of reception of the segment file (e.g., sf1).

Continuing with the above-stated example, and referring to FIGS. 3 through 5, as shown in each case the time difference between completion of reception of the segment file sf1 and the beginning of reception of the segment file sf1 is less than the drain time (i.e., Dr(t)1) of the media data of segment file sf1. As such, in each embodiment depicted in FIGS. 3 through 5, the file transfer delay factor may be positive, indicating that the file transfer of segment file sf1 is less than the drain time of the media data included within segment file sf1. As such, file transfer delays should not impede consumption of the streaming media product.

Figure 6:

Referring also so FIG. 6, the situation is shown in which the file transfer time (i.e., t2–t1) of segment file sf1 is generally equal to the drain time (i.e., Dr(t)1) of segment file sf1. As such, the file transfer delay factor may be generally zero, indicating a general balance between the reception of media data and the consumption data. In a generally balanced condition, the file transfer delay factor may not impede consumption of the streaming media product. However, as with a zero system delay factor, an increase in the file transfer delay factor may result in an underflow condition, which may potentially disrupt the consumption of the streaming media product.

Figure 7:
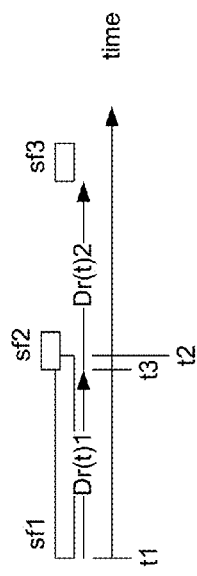
Figure 8:
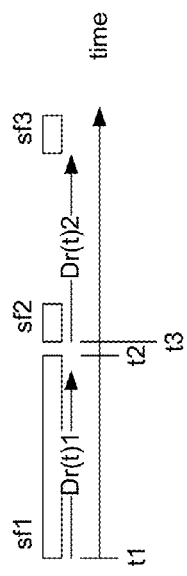

Referring next to FIGS. 7 and 8, in each embodiment the file transfer time (i.e., t2–t1) for segment file sf1 is greater than the drain time (i.e., Dr(t)1) of the media data included within segment file sf1. As such, it may take longer to complete reception of segment file sf1 than the consumption of the media included within segment file sf1. The situation depicted in FIGS. 7 and 8 may indicate an underflow condition, in which media data may be consumed at a faster rate than media data is arriving at the consumption node (e.g., computing device 38).

Similar to the system delay factor, information necessary for determining 102 the file transfer delay factor may be received by media indexing process 10, e.g., from a reporting process executing on a computing device (e.g., reporting process 22 executed on computing device 38, reporting process 28 executed on node 46, etc.). Reception of information relating to the file transfer delay factor from intermediate node may allow localized network problems that may impede consumption of the streaming media product to be determined. In the case of adaptive streaming protocols, the file transfer delay factor may be updated at the completion of reception of each segment file (e.g., sf1, sf2, sf3).

Each of the system delay factor and the file transfer delay factor may generally provide an indicator of how long a data stream should be buffered at its nominal bit rate to prevent display underruns (i.e., interruptions in consumption of the streaming media product). For example, as discussed above underflow conditions may impede the consumption of the streaming media product, however typically at least a portion of the streaming media product may be buffered on the consumption node (e.g., stored on storage device 30 associated with computing device 38) prior to beginning consumption of the streaming media product. As such, transient underflows, and/or underflows less than the buffered data, may not impede consumption of the streaming media product. However, building a buffer results in a delay before a user (e.g., user 48) may begin consuming the streaming media product. Accordingly, it may only be desirable to build-up the minimum buffer that is likely to enable consumption of the complete streaming media product without and disruptions in consumption. Determination 100, 102 of the system delay factor and the file transfer delay factor may enable the minimum buffer size to be determined, e.g., based upon, at least in part, determined 100, 102 underflow, balanced, or overflow conditions associated with segment files of the streaming media product. Additionally, the system delay factor and the file transfer delay factor, alone and/or considered together, may also provide a measure of the network latency that must be inducted from buffering, which is required to accommodate stream jitter and prevent loss. While it is not a requirement of the present disclosure, generally for typical stream rates of between about 0.04 Mb/s and 2 Mb/s, the system delay factor and the file transfer delay factor may be determined 100, 102 with a resolution of tenths of a second.

Media indexing process 10 may determine 104 a media delivery composite for the segment file of the streaming media product. The media delivery composite may be based upon, at least in part, the system delay factor associated with the segment file and the file transfer delay factor associated with the segment file. According to one embodiment, the media delivery composite may be a composite of the system delay factor and the file transfer delay factor. As such, the media delivery composite may, for example, provide an indicator of the condition of a media stream, provide a relative indicator of needed buffer depths at the consumer node due to file delivery time jitter as well as an indication of excessive file delivery times resulting in media underflow, etc. As such, the media delivery composite may allow problems to be identified with a streaming media server and/or client, as well as with the network over which the streaming media product is being consumed. The media delivery composite may, therefore, be utilized to plan allocation of resources for improving the delivery of streaming media (e.g., network improvements, server improvements, etc.).

As mentioned, in one embodiment, the media delivery composite may include a composite of the system delay factor and the file transfer delay factor. For example, media indexing process may determine 104 a media delivery composite that may include both the sign and magnitude of each of the system delay factor and the file transfer delay factor. For example, the media delivery composite of 0 s, +9 s may indicate a zero system delay factor and a plus nine second file transfer delay factor. In one particular embodiment, media indexing process 10 may determine 104 a real time, or instantaneous media delivery composite. The instantaneous media delivery composite may, for example provide an indicator of a current state of the streaming media flow.

Media indexing process 10 may also determine 106 (either alone or in conjunction with a reporting process, such as reporting processes 22, 28) a media loss rate associated with the segment file of the streaming media product. The media loss rate may be the rate at which media data is not successfully transmitted between the server (e.g., server computer 12) and the consumption node (e.g., computing device 28). Media loss rate may be less important (e.g., and may even be zero) for ARQ (Automatic Repeat reQuest) protocols, such as TCP, in which packets not acknowledged as received may be retransmitted until reception of all packets is acknowledged. Media indexing process 10 may utilize the media loss rate in determining 104 the media delivery composite. For example, a relatively high media loss rate may devalue the media delivery composite, as a relatively high media loss rate may impede the consumption and/or quality of the streaming media product as consumed.

Media indexing process 10 may associate 108 the media delivery composite with a state metric. For example, consistent with the general positive, zero, and negative possible conditions for each of the system delay factor and the file transfer delay factor, five general media delivery state metrics may be possible, namely:

| State | DFsys | DFft | Result |
|---|---|---|---|
| 1 | − | − | Underflow |
| 2 | − | + | Underflow |
| 3 | + | + | Overflow |
| 4 | 0 | 0 | Balance |
| 5 | 0 | + | Balance |

As shown above, state 1 may generally indicates a condition in which the system delay factor is in an underflow condition and the file transfer delay factor is also in an underflow condition (e.g., both the system delay factor and the file transfer delay factor are a negative value), which may be a condition as shown in FIGS. 7 and 8. State 2 indicates that the system delay factor is in an underflow condition (e.g., the system delay factor is a negative value), but that the file transfer delay factor is in an overflow condition (e.g., the file transfer delay factor is a positive value), which may be a condition as shown in FIG. 5. State 3 generally indicates that both the system delay factor and the file transfer delay factor are in an overflow condition (e.g., both the system delay factor and the file transfer delay factor have a positive value), as generally shown in FIG. 4. State 4 is a generally balanced state, with both the system delay factor and the file transfer delay factor being in a generally balanced state, as generally shown in FIG. 6. Finally, state 5 generally indicates a condition in which the system delay factor is in a generally balanced condition, and the file transfer delay factor is in an overflow condition (e.g., the file transfer delay factor has a positive value), as generally shown in FIG. 3. It should be appreciated herein that a zero value of the system delay factor and/or the file transfer delay factor may be used to indicate a generally balanced flow between the delivery and consumption of media data. As such, while the balanced condition may be indicated by the value zero, the generally balanced condition indicated thereby need not require a value of zero derived from either of the above system delay factor equation or the file transfer delay factor equation. Rather, a generally balanced condition may be indicated by a +/− margin (e.g., a window) around a zero value. For example, the margin indicating a generally balanced state may be +/−40% of the drain time (e.g., (Dr(t)1), or less. The margin indicating a generally balanced state may vary depending upon implementations, for example, in some embodiments the generally balanced state may be indicated by a margin of +/−20% of the drain time. Other values may similarly be utilized depending upon design criteria and user need.

Figure 9:
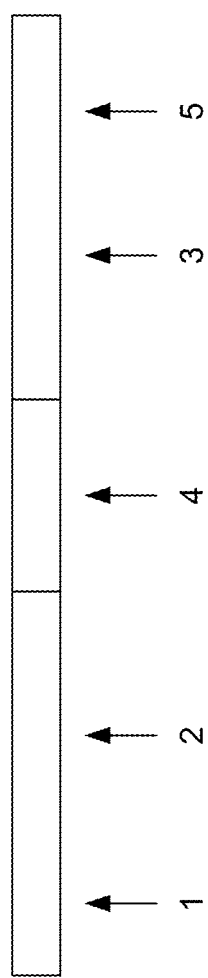
FIG. 9 diagrammatically depicts a graphical display of various media delivery state metrics.

Referring to FIG. 9, media indexing process 10 may associate 108 the media delivery composite with a state metric (described above) by reference to a graphical display. For example, as shown, the five state may be applied graphically to facilitate easy reference and determination of a relative state of a streaming media flow. Consistent with the five state metrics described above, the state 1, in which both the system delay factor and the file transfer delay factor are in an underflow condition may be indicated on the far left of the graphic, indicating a complete underflow condition. State 2, in which the system delay factor indicates an underflow condition but the file transfer delay factor has a positive value, may be indicated to the left of center of the graphic, indicating a system-level underflow condition, but acceptable file transfer delay. State 3, in which both the system delay factor and the file transfer delay factor are in an overflow condition is indicated to the right of center of the graphic, indicating a good status, but that, in some circumstances, excessive server resources may be expended by over-delivering media data (e.g., which resources could, in some situation be used to service other clients) and that excessive client resources may be expended by over-buffering media data (e.g., which may, in some circumstances unduly tax the client resources). State 4, in which both the system delay factor and the file transfer delay factor are in a generally balanced condition is indicated generally in the center of the graphic, indicating that while the streaming media may be consumed without error, a shift of the system delay factor and/or the file transfer delay factor to an underflow condition may result in an impairment of consumption of the streaming media product. State 5, in which the system delay factor is generally at balance and the file transfer delay factor is in an overflow condition (e.g., the file transfer delay factor has a positive value) is indicated on the right of the graphic, indicating that the streaming media product may be consumed without error, and that server and client resources may be appropriately utilized (e.g., the server may not be over-delivering media data, and the client may not be over buffering media data).

It should be appreciated that qualitative statements, such as over-delivering media data and over-buffering media data are not intended to limit the application of the present disclosure, but merely to indicate a use-case example. For example, in some implementations, it may be desirable to deliver the entirety of the streaming media product to a client in a relatively short period of time such that the streaming media product may be largely and/or fully buffered during consumption. In such an instance, a preferred circumstance may be state 3, in which both the system delay factor and the file transfer delay factor are in an overflow condition. Various additional/alternative implementations are also considered within the scope of this disclosure.

Media indexing process 10 may determine 110 a media delivery composite for a plurality of segment files associated with the streaming media product. The determined 110 media delivery composite for the plurality of segment files associated with the streaming media product may provide a media delivery composite for the streaming media product over a period of time. For example, the media delivery composite for the plurality of segment files may provide information such as a maximum media delivery composite over time, a minimum media delivery composite over time, an average media delivery composite during the time period of examination, and/or may allow an instantaneous media delivery composite for a specified time or time frame to be realized. The media delivery composite for the plurality of segment files may show, for example, the worst case arrival time deviation, or jitter, relative to the nominal traffic rate. The deviation, or variation over time, may indicate segment file transfer time delay variations (i.e., jitter) or time gaps between segment files. In addition to allowing system and network trouble shooting to improve the quality of streaming media received by a user, a media delivery composite indicating, or approaching, an underflow condition may indicate that client side media buffers should be prefilled in order to provide streaming media that does not experience impeded consumption.

Media indexing process 10 may further aggregate 112 a plurality of media delivery composites for a plurality of segment files associated with one or more streaming media products. For example, media indexing process 10 may aggregate 112 media delivery composites associated with multiple media streams (e.g., including the same streaming media product delivered to a plurality of different users, and/or including different streaming media products delivered to one or more users). The aggregated 112 media delivery composites may enable system wide problems to be ascertained for a single, or for multiple, streaming media providers. For example, the aggregated 112 media delivery composites may be compared against one another to allow individual streaming media providers (i.e., providers of identifiable streaming media products) to ascertain problems (e.g., oversubscription, poorly managed distribution systems, etc.) within a given media distribution system (e.g., media distribution server) based upon, at least in part, a relatively poor media delivery composite, as compared to the media delivery composites of other media providers. Similarly, network-wide deficiencies may be ascertained, e.g., based upon, at least in part, relatively poor media delivery composites of multiple media providers for streaming media provided across a common network, or geographic network regions. Various additional/alternative applications of aggregated media delivery composites will be readily appreciated by those having skill in the art.

While media indexing process 10, which may generally determine a system delay factor and a file transfer delay factor associated with a segment file of a streaming media product, and may determine a media delivery composite, has been shown associated with server computer 12, and may receive system delay and file transfer delay information from one or more reporting processes, this should not be construed as a limitation of the present disclosure. For example, a media indexing process may reside on a video consumption device or network node. A media indexing process residing on a video consumption device or network node may directly determine the system delay factor, file transfer delay factor, and media delivery composite. In some instances, the media delivery composite determined by the media indexing process residing on a video consumption device or network node may report the media delivery composite (and/or the system delay factor, file transfer delay factor, etc) to an aggregation application, e.g., which may reside on server computer 12. Many additional/alternative embodiments may be equally utilized.

A number of implementations have been described. Nevertheless, it will be understood that various modifications may be made. Accordingly, other implementations are within the scope of the following claims.

What is claimed is:

1. A computer-implemented method comprising:
   determining, by one or more computing devices, a system delay factor associated with a segment file of a streaming media product, wherein the system delay factor is based, at least in part, upon a drain time of the segment file and an arrival time of the segment file, and is further based, at least in part, upon server processing characteristics and client processing characteristics;
   determining, by the one or more computing devices, a file transfer delay factor associated with the segment file of the streaming media product, wherein the file transfer delay factor is based, at least in part, upon a drain time of media data of the segment file and a transfer time for the segment file;
   determining and creating, by the one or more computing devices, a media delivery composite for the segment file of the streaming media product based upon, at least in part, the system delay factor associated with the segment file and the file transfer delay factor associated with the segment file to plan allocation of resources for delivery of the streaming media product; and
   determining, by the one or more computing devices, for how long packets corresponding to a data stream should be buffered at a nominal bit rate of the streaming media product to prevent display underruns of the segment file based upon, at least in part, the media delivery composite for the segment file of the streaming media file product.

2. The computer-implemented method according to claim 1, wherein the system delay factor associated with the segment file is based upon, at least in part, a request/fulfill time for a subsequent segment file and a transfer time associated with the segment file of the streaming media product.

3. The computer-implemented method according to claim 1, wherein the system delay factor associated with the segment file is based upon, at least in part, the greater of a completion time for the reception of the segment file and the arrival time of a second segment file of the streaming media product.

4. The computer-implemented method according to claim 1, further comprising determining, by the one or more computing devices, a media loss rate associated with the segment file of the streaming media product.

5. The computer-implemented method according to claim 1, further comprising associating, by the one or more computing devices, the media delivery composite with a state metric.

6. The computer-implemented method according to claim 1, further comprising determining, by the one or more computing devices, a media delivery composite for a plurality of segment files associated with the streaming media product.

7. The computer-implemented method according to claim 1, further comprising aggregating a plurality of media delivery composites for a plurality of segment files associated with one or more streaming media products.

8. A computer program product comprising a non-transitory computer readable medium having a plurality of instructions stored thereon, which, when executed by a processor, cause the processor to perform operations comprising:
   determining a system delay factor associated with a segment file of a streaming media product, wherein the system delay factor is based, at least in part, upon a drain time of the segment file and an arrival time of the segment file, and is further based, at least in part, upon server processing characteristics and client processing characteristics;
   determining a file transfer delay factor associated with the segment file of the streaming media product, wherein the file transfer delay factor is based, at least in part, upon a drain time of media data of the segment file and a transfer time for the segment file;
   determining and creating a media delivery composite for the segment file of the streaming media product based upon, at least in part, the system delay factor associated with the segment file and the file transfer delay factor associated with the segment file to plan allocation of resources for delivery of the streaming media product; and
   determining for how long packets corresponding to a data stream should be buffered at a nominal bit rate of the streaming media product to prevent display underruns of the segment file based upon, at least in part, the media delivery composite for the segment file of the streaming media file product.

9. The computer program product according to claim 8, wherein the system delay factor associated with the segment file is based upon, at least in part, a request/fulfill time for a subsequent segment file and a transfer time associated with the segment file of the streaming media product.

10. The computer program product according to claim 8, wherein the system delay factor associated with the segment file is based upon, at least in part, the greater of a completion time for the reception of the segment file and the arrival time of a second segment file of the streaming media product.

11. The computer program product according to claim 8, further comprising instructions for determining a media loss rate associated with the segment file of the streaming media product.

12. The computer program product according to claim 8, further comprising instructions for associating the media delivery composite with a state metric.

13. The computer program product according to claim 8, further comprising instructions for determining a media delivery composite for a plurality of segment files associated with the streaming media product.

14. The computer program product according to claim 8, further comprising instructions for aggregating a plurality of media delivery composites for a plurality of segment files associated with one or more streaming media products.

15. A computing system including a processor and a memory configured to perform operations comprising:
   determining, by one or more computing devices, a system delay factor associated with a segment file of a streaming media product, wherein the system delay factor is based, at least in part, upon a drain time of the segment file and an arrival time of the segment file, and is further based, at least in part, upon server processing characteristics and client processing characteristics;
   determining, by the one or more computing devices, a file transfer delay factor associated with the segment file of the streaming media product, wherein the file transfer delay factor is based, at least in part, upon a drain time of media data of the segment file and a transfer time for the segment file;
   determining and creating, by the one or more computing devices, a media delivery composite for the segment file of the streaming media product based upon, at least in part, the system delay factor associated with the segment file and the file transfer delay factor associated with the segment file to plan allocation of resources for delivery of the streaming media product; and
   determining, by the one or more computing devices, for how long packets corresponding to a data stream should be buffered at a nominal bit rate of the streaming media product to prevent display underruns of the segment file based upon, at least in part, the media delivery composite for the segment file of the streaming media file product.

16. The computing system according to claim 15, wherein the system delay factor associated with the segment file is based upon, at least in part, a request/fulfill time for a subsequent segment file and a transfer time associated with the segment file of the streaming media product.

17. The computing system according to claim 15, wherein the system delay factor associated with the segment file is based upon, at least in part, the greater of a completion time for the reception of the segment file and the arrival time of a second segment file of the streaming media product.

18. The computing system according to claim 15, further comprising determining a media loss rate associated with the segment file of the streaming media product.

19. The computing system according to claim 15, further comprising associating the media delivery composite with a state metric.

20. The computing system according to claim 15, further comprising determining a media delivery composite for a plurality of segment files associated with the streaming media product.

21. The computing system according to claim 15, further comprising aggregating a plurality of media delivery composites for a plurality of segment files associated with one or more streaming media products.

* * * * *